United States Patent
Suga

(10) Patent No.: US 9,795,889 B2
(45) Date of Patent: Oct. 24, 2017

(54) GAME PROGRAM AND INFORMATION PROCESSING DEVICE

(71) Applicant: DeNA Co., Ltd., Tokyo (JP)

(72) Inventor: Akihiro Suga, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 198 days.

(21) Appl. No.: 14/668,904

(22) Filed: Mar. 25, 2015

(65) Prior Publication Data

US 2015/0283466 A1    Oct. 8, 2015

(30) Foreign Application Priority Data

Apr. 2, 2014 (JP) ................................. 2014-076031

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/822* | (2014.01) |
| *A63F 13/537* | (2014.01) |
| *A63F 13/533* | (2014.01) |
| *A63F 13/825* | (2014.01) |

(52) U.S. Cl.
CPC .......... *A63F 13/822* (2014.09); *A63F 13/533* (2014.09); *A63F 13/537* (2014.09); *A63F 13/825* (2014.09); *A63F 2300/5553* (2013.01)

(58) Field of Classification Search
CPC ....................................................... A63F 1/00
See application file for complete search history.

(56) References Cited

FOREIGN PATENT DOCUMENTS

| JP | 2001-120840 A | 5/2001 |
|---|---|---|
| JP | 5118261 B | 10/2012 |
| JP | 5409876 B | 11/2013 |

OTHER PUBLICATIONS

Leif Johnson, "The Orgrimmar Shuffle," Mar. 19, 2014, http://www.gamespot.com/reviews/hearthstone-heroes-of-warcraft-review/1900-6415707/.*
"Hearthstone: Heroes of Warcraft," Jul. 9, 2014, game released Mar. 11, 2014, https://web.archive.org/web/20140709124005/http://en.wikipedia.org/wiki/Hearthstone:_Heroes_of_Warcraft.*
Exitium, "Automatic card decks," May 12, 2014, http://us.battle.net/forums/en/hearthstone/topic/12673849552.*
Game Guide, Jan. 22, 2014, https://web.archive.org/web/20140122063630/http://us.battle.net/hearthstone/en/game-guide/.*
Hearthstone Arena Guide: Short Video Series—Draft—Priest, Nov. 26, 2013, https://www.youtube.com/watch?v=vfgkeREh5Uw.*

(Continued)

*Primary Examiner* — Kevin Y Kim
(74) *Attorney, Agent, or Firm* — Procopio, Cory, Hargreaves & Savitch LLP

(57) ABSTRACT

The game program that relates to the present invention directs a computer to execute a process that involves extracting all of the groups that can be constituted by combining a plurality of characters owned by the player from among a plurality of groups respectively composed of a plurality of pre-associated characters, a process that involves assembling a deck constituted by combining groups consecutively selected from all of the extracted groups, and a process that involves conducting a battle game during which the deck is engaged in battle by causing the deck to generate the special effects associated with each selected group.

4 Claims, 8 Drawing Sheets

(56) References Cited

OTHER PUBLICATIONS

Japanese Patent Application No. 2014-076031:Office Action dated May 7, 2014.
Japanese Patent Application No. 2014-076031:Office Action dated Jul. 15, 2014.
Itoh, Noriomi et al., Increase Your Fighting Power with Deck Bonuses!, Dynasty Warriors DS—Fighters Battle, Strongest Guide, Japan, Koei Ltd., Jun. 5, 2008,1st Edition, pp. 126-127.
Japanese Patent Application No. 2014-076031:Pretrial Reexamination report dated Dec. 22, 2014.

* cited by examiner

[FIG. 1]
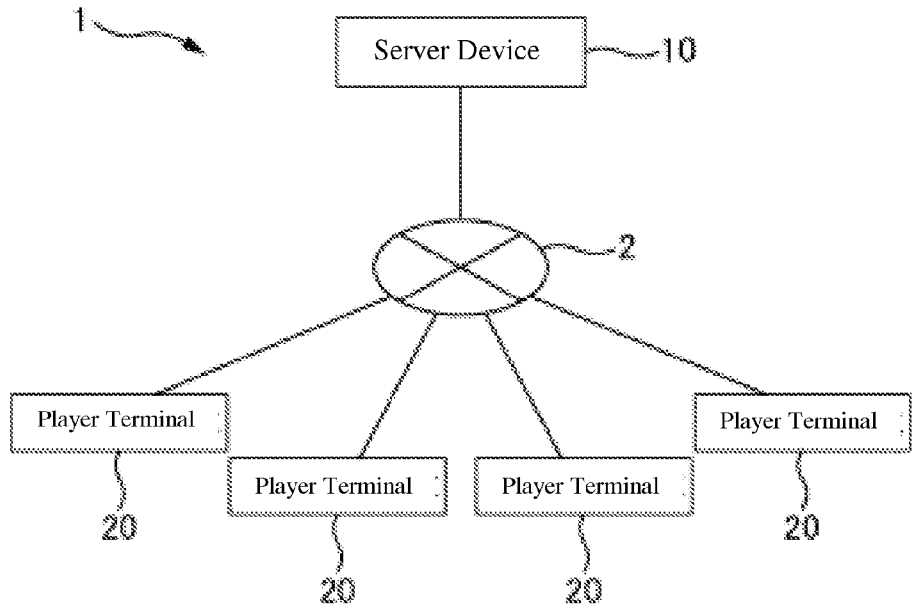
[FIG. 2]
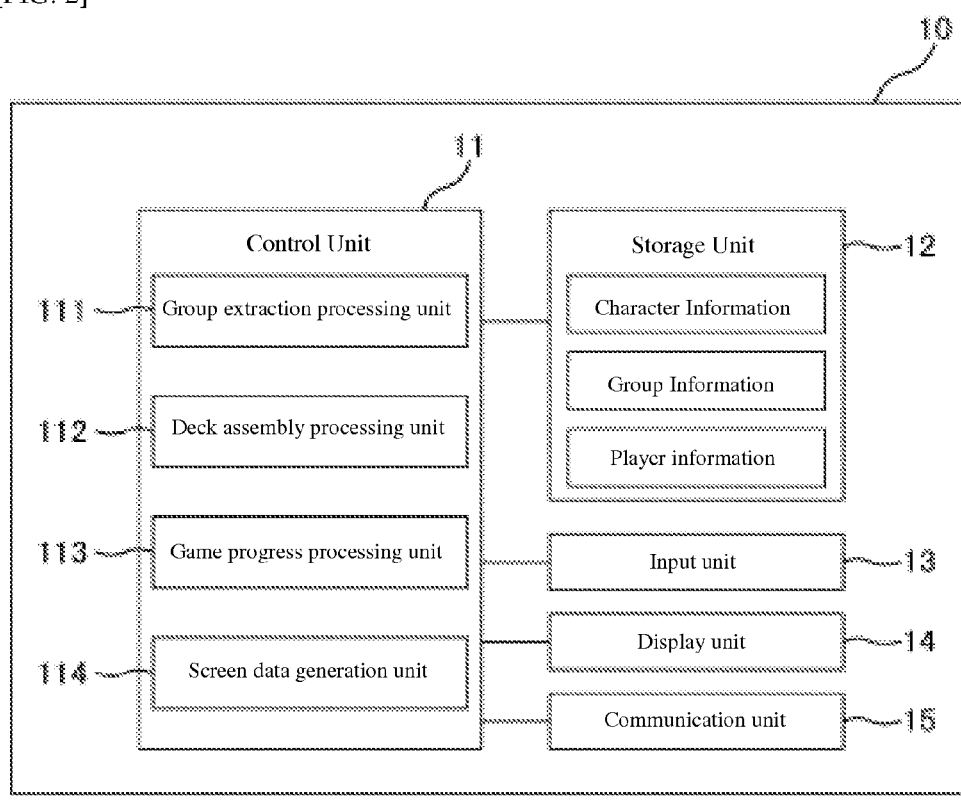

[FIG. 3]

| Character ID | Character Name | Character Image | Effect ID | Motif ID | Initial Attack Strength | Maximum Attack Strength | Initial Defense Strength | Maximum Defense Strength | Initial Hit Points | Maximum Hit Points |
|---|---|---|---|---|---|---|---|---|---|---|
| 001 | Character A |  | 0001 | 0001 | 15 | 1500 | 8 | 800 | 10 | 1000 |
| 002 | Character B |  | 0001 | 0002 | 30 | 3000 | 20 | 2000 | 15 | 1500 |
| 003 | Character C |  | 0001 | 0001 | 45 | 4500 | 30 | 3000 | 25 | 2500 |
| 004 | Character D |  | 0001 | 0002 | 60 | 6000 | 55 | 5500 | 60 | 6000 |
| - | - | - | - | - | - | - | - | - | - | - |
| - | - | - | - | - | - | - | - | - | - | - |
| - | - | - | - | - | - | - | - | - | - | - |

[FIG. 4]

| Group ID | Group Name | Level | Constituent Characters || Special Effects |
|---|---|---|---|---|---|
| 001 | Clan A | 6 | 1 | Character ID 0001 | Attack Strength +10 Defense Strength +10 |
|  |  |  | 2 | Character ID 0002 |  |
|  |  |  | 3 | Character ID 0003 |  |
|  |  |  | 4 | Character ID 0004 |  |
|  |  |  | 5 | Character ID 0005 |  |
| - | - | - |  | - | - |
| - | - | - |  | - | - |
| - | - | - |  | - | - |
| 010 | Three Generals | 5 | 1 | Character ID 0010 | Attack Strength + 6 Defense Strength + 6 |
|  |  |  | 2 | Character ID 0015 |  |
|  |  |  | 3 | Character ID 0020 |  |
| - | - | - |  | - | - |
| - | - | - |  | - | - |
| - | - | - |  | - | - |
| 020 | Teacher-Student Relationship | 4 | 1 | Character ID 0001 | Attack Strength + 4 Defense Strength + 4 |
|  |  |  | 2 | Character ID 0050 |  |
| - | - | - |  | - | - |
| - | - | - |  | - | - |
| - | - | - |  | - | - |

[FIG. 5]

| Player ID | Player Name | Proprietary Character Information | Deck Information |
|---|---|---|---|
| 1 | A | Proprietary Character Information (1) | Deck Information (1) |
| 2 | B | Proprietary Character Information (2) | Deck Information (2) |
| 3 | C | Proprietary Character Information (3) | Deck Information (3) |
| 4 | D | Proprietary Character Information (4) | Deck Information (4) |
| 5 | E | Proprietary Character Information (5) | Deck Information (5) |
| 6 | F | Proprietary Character Information (6) | Deck Information (6) |
| - | - | - | - |
| - | - | - | - |
| - | - | - | - |

[FIG. 6]

Proprietary Character Information (3)
Proprietary Character Information (2)
Proprietary Character Information (1)

| Character ID | Level | Attack Strength | Defense Strength | Hit Points |
|---|---|---|---|---|
| 0011 | Lv.3 | 25 | 100 | 60 |
| 0211 | Lv.4 | 70 | 70 | 80 |
| 0133 | Lv.7 | 60 | 300 | 100 |
|  |  |  |  |  |

[FIG. 7]

| Character Placement ||
|---|---|
| Area ID | Character ID |
| 1 | 0051 |
| 2 | 1240 |
| 3 | 0756 |
| 4 | 1089 |
| 5 | 0133 |
| 6 | 0007 |
| 7 | 0936 |
| 8 | 0211 |
| 9 | 011 |

[FIG. 8]
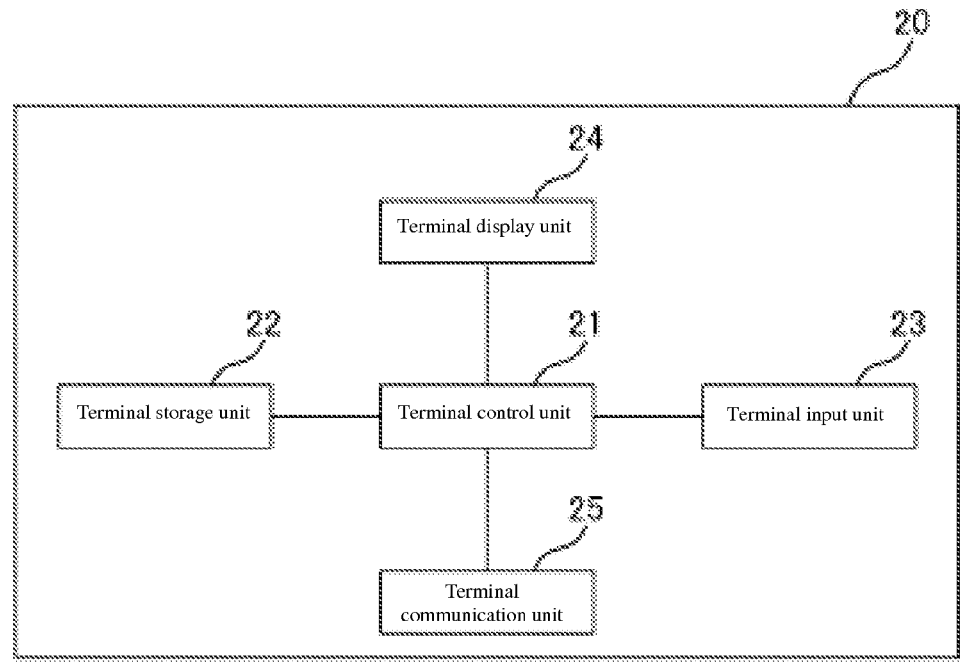
[FIG. 9]
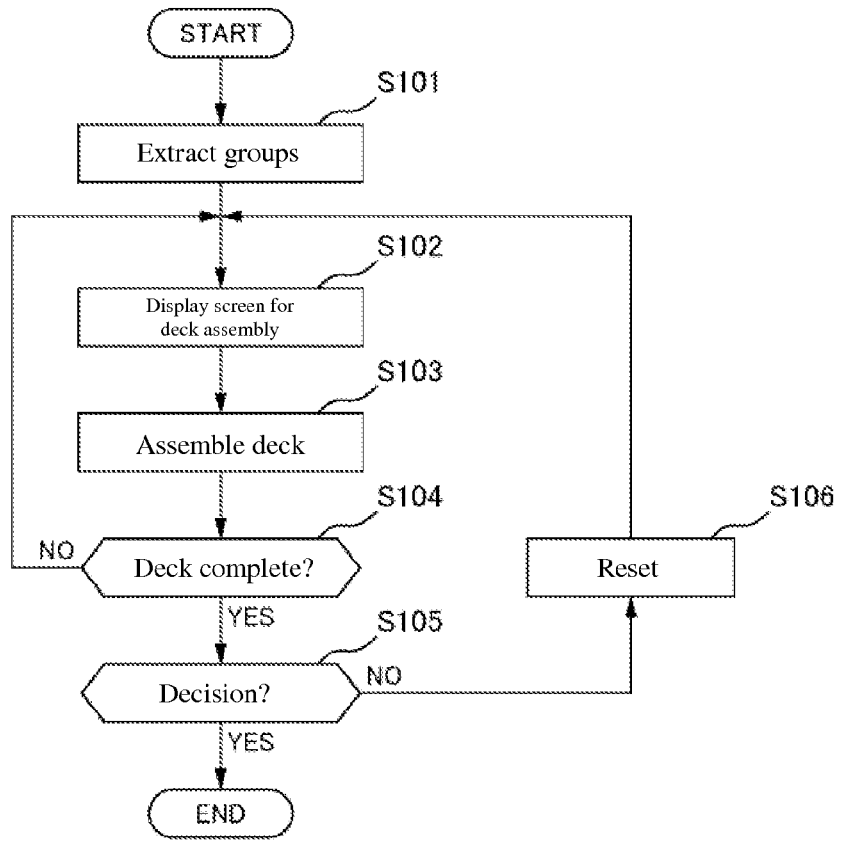

[FIG. 10]
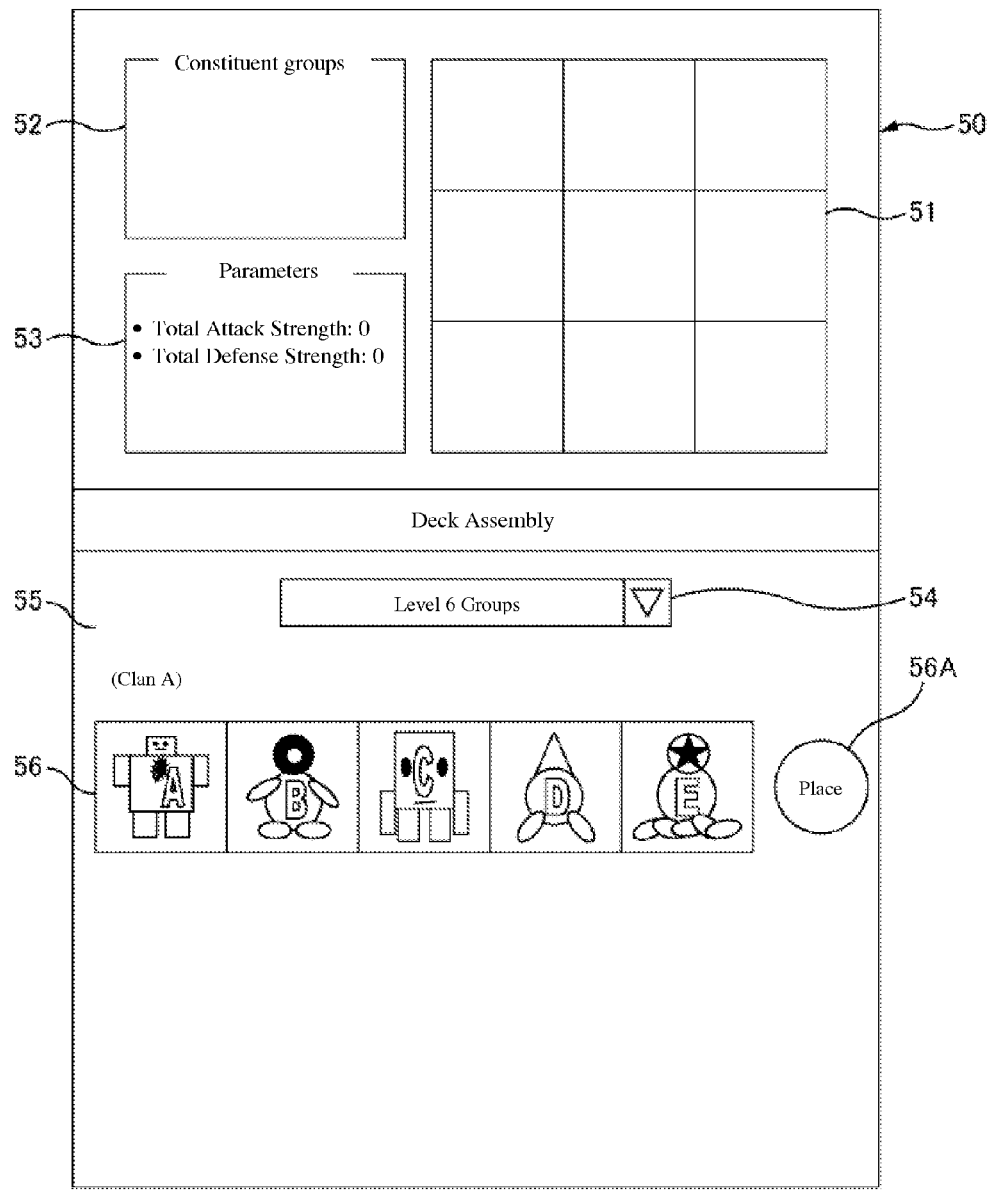

[FIG. 11]
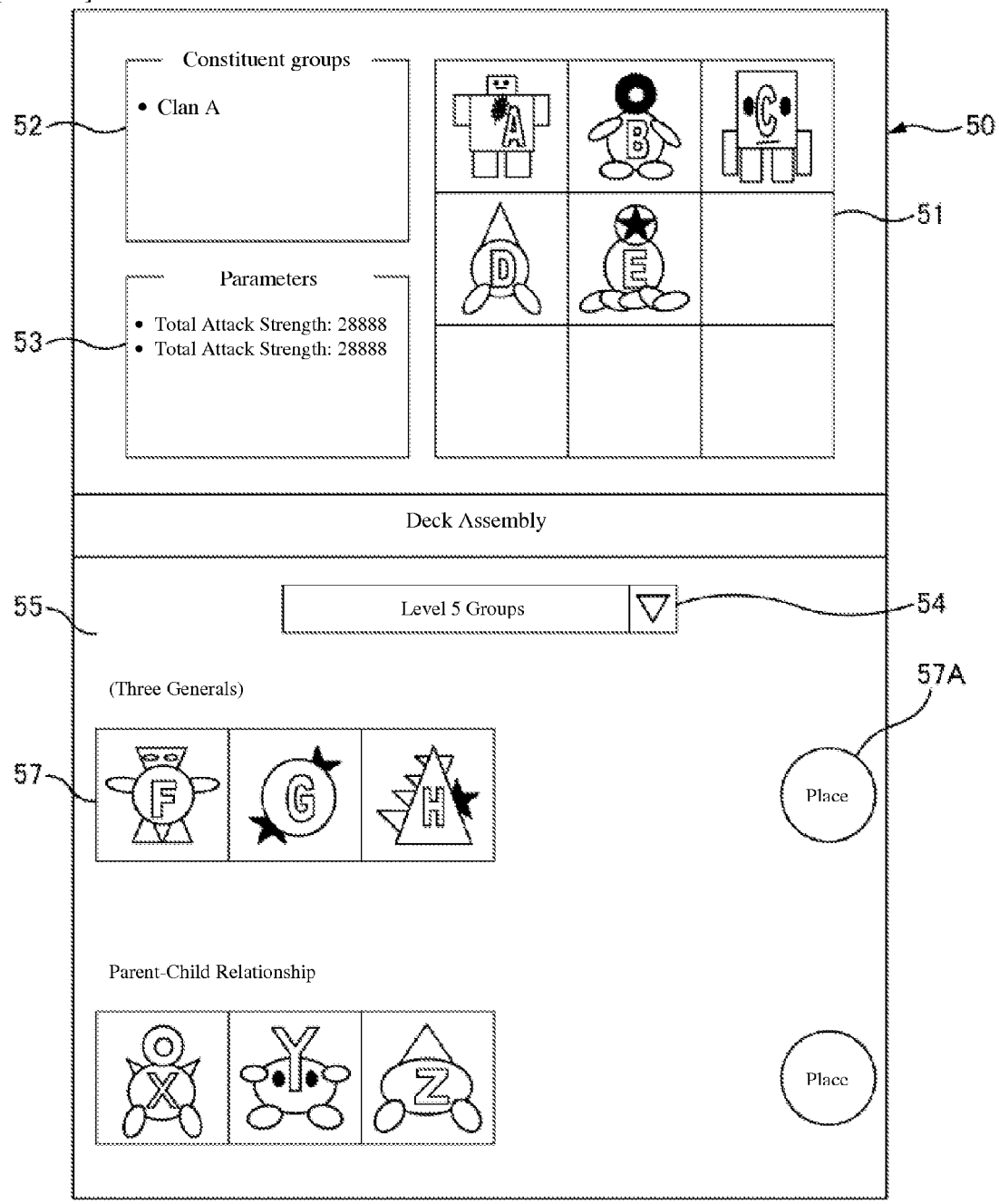

[FIG. 12]
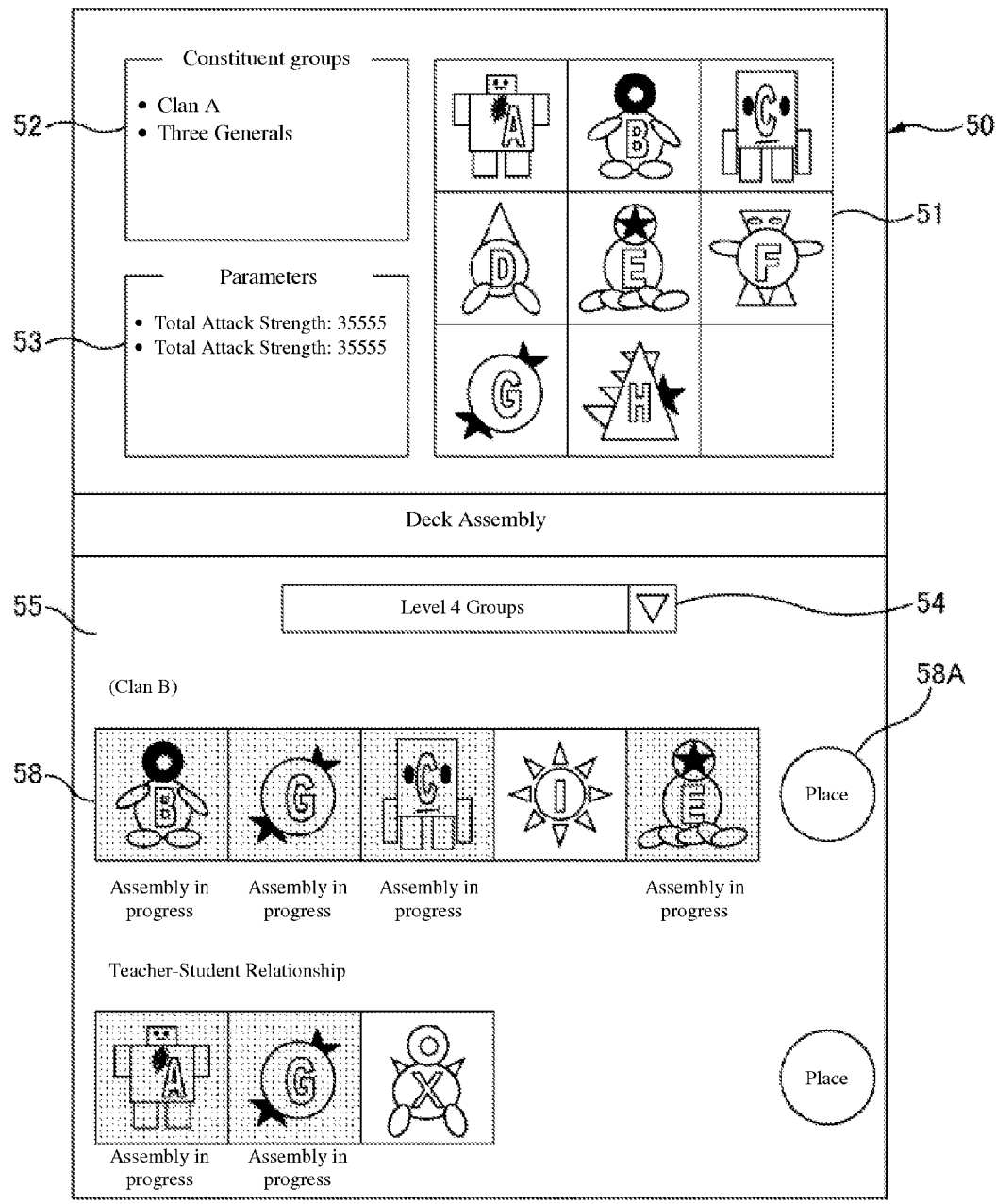

[FIG. 13]
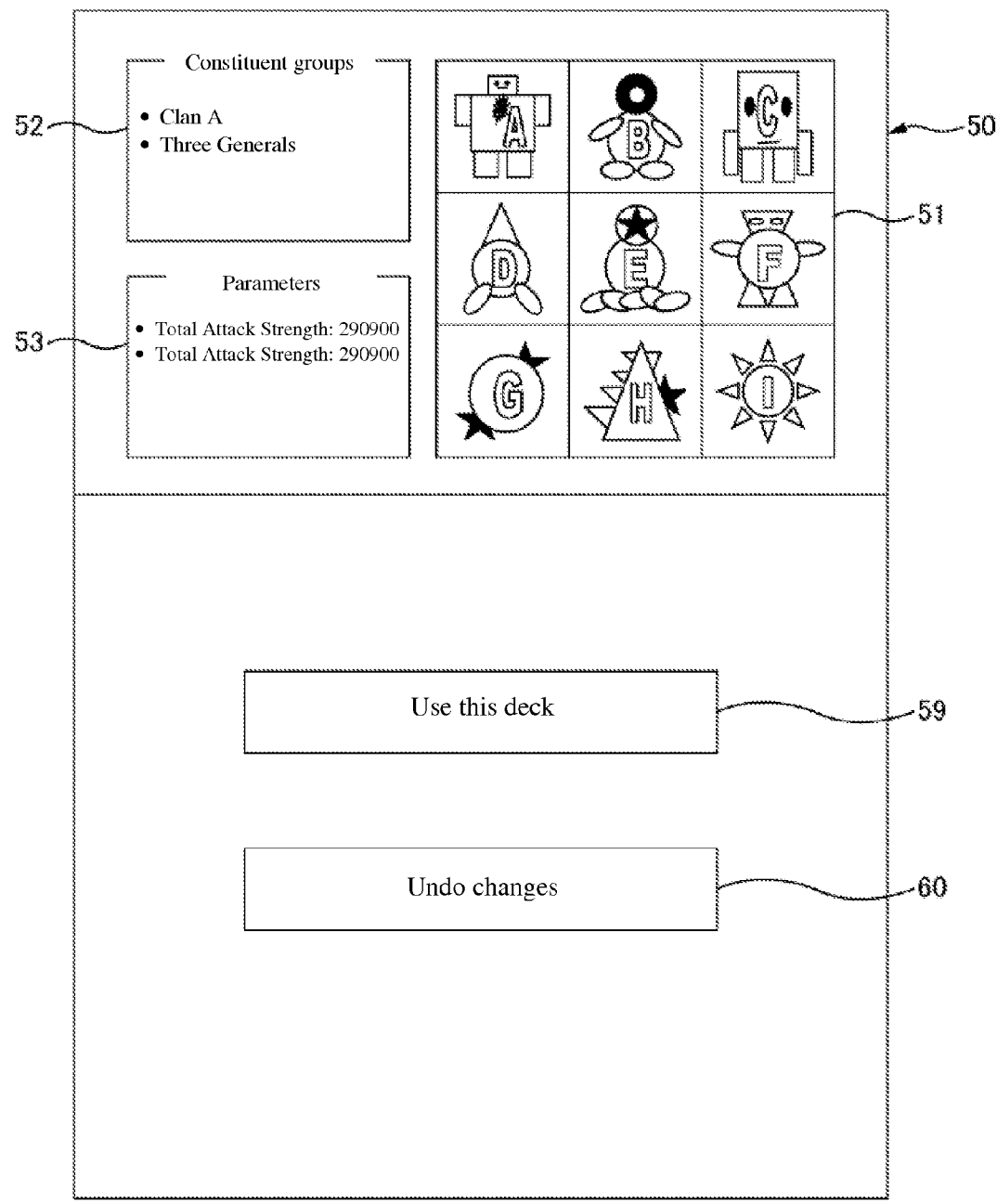

GAME PROGRAM AND INFORMATION PROCESSING DEVICE

This application claims the benefit of foreign priority under 35 USC 119(a) based on Japanese Patent Application No. 2014-076031, filed Apr. 2, 2014, the contents of which is incorporated herein by reference in its entirety.

BACKGROUND

1. Technical Field

The present invention relates to a game program and an information processing device.

2. Background Art

Game programs are known that direct a computer to execute a process, in which a group of characters composed of a plurality of characters (hereinafter referred to as "deck") is assembled in accordance with a player's operations, and a process in which, after assembling a deck composed of mutually related characters, a battle game is conducted by causing the deck to produce special effects (for example, see Patent Document 1).

PRIOR ART LITERATURE

Patent Literature

Patent Document 1
Japanese Patent Publication No. 5118261

SUMMARY

In such a battle game, when a player wants to assemble a deck capable of producing special effects, the deck has to be assembled by choosing characters one by one and trying various combinations if it is unknown which characters are mutually related.

The present invention has been devised with such circumstances in mind and it is an object of the invention to reduce the effort required for the operations performed by the player during deck assembly.

The main aspect of the present invention aimed at solving the above-mentioned problems is a game program (e.g., a non-transitory computer readable medium having machine-executable instructions) that directs a computer to execute:

a group extraction process during which, based on player information having configured therein a plurality of characters owned by a player and group information having configured therein a plurality of groups respectively composed of a plurality of pre-associated characters, all of the groups that can be constituted by combining the plurality of characters owned by the player are extracted from among a plurality of groups;

a deck assembly process during which a deck constituted by combining consecutively selected groups is assembled by consecutively selecting groups from among all of the extracted groups each time a selection operation is performed by the player; and a game progression process during which a battle game, wherein the deck is engaged in a battle, is conducted by causing the deck to generate special effects associated with each selected group.

Other features of the present invention will become apparent from this Description and the accompanying drawings.

BRIEF DESCRIPTION OF THE DRAWINGS

FIG. 1 is a diagram showing an example of the overall constitution of the game system 1.

FIG. 2 is a block diagram showing a functional constitution of the server device 10.

FIG. 3 is a diagram showing an example of a data structure of character information.

FIG. 4 is a diagram showing an example of a data structure of group information.

FIG. 5 is a a diagram showing an example of a data structure of player information.

FIG. 6 is a diagram showing an example of a data structure of proprietary character information.

FIG. 7 is a diagram showing an example of a data structure of deck information.

FIG. 8 is a block diagram showing a functional constitution of a player terminal 20.

FIG. 9 is a flow chart illustrating an example of an operation of the game system 1.

FIG. 10 is a diagram illustrating a screen transition (No. 1) during deck assembly.

FIG. 11 is a diagram illustrating a screen transition (No. 2) during deck assembly.

FIG. 12 is a diagram illustrating a screen transition (No. 3) during deck assembly.

FIG. 13 is a diagram illustrating a screen transition (No. 4) during deck assembly.

DETAILED DESCRIPTION

At least the following will become apparent from this Description and the accompanying drawings. Namely, a game program that directs a computer to execute:

a group extraction process during which, based on player information having configured therein a plurality of characters owned by a player and group information having configured therein a plurality of groups respectively composed of a plurality of pre-associated characters, all of the groups that can be constituted by combining a plurality of characters owned by the player are extracted from among a plurality of groups;

a deck assembly process during which a deck constituted by combining consecutively selected groups is assembled by consecutively selecting groups from among all of the extracted groups each time a selection operation is performed by the player; and a game progression process during which a battle game, wherein the deck is engaged in a battle, is conducted by causing the deck to generate special effects associated with each selected group.

In accordance with such a game program, the player can readily assemble a deck capable of producing special effects simply by selecting groups even when it is unknown which characters are mutually related, thereby making it possible to reduce the effort required for the operations performed by the player during deck assembly.

In addition, the program may be made to direct a computer to execute a screen data generation process that generates screen data used to display, on a game screen, a group display area that shows a list view of all or some of the extracted groups, and a deck display area that displays a deck assembled using groups selected in the group display area in accordance with the player's selection operations, and when the player's selection operations are performed in a continuous manner, generates screen data used to display a deck assembled using groups already selected in accordance with the player's previous selection operations in the deck display area, as well as to display, in the group display area, other groups that include characters in common with the groups already selected in accordance with the player's previous selection operations.

In accordance with such a game program, a deck can be assembled in an efficient manner because the player can, at a later time, select other groups that contain characters in common with the previously selected groups.

In addition, when the number of characters in a deck assembled from the groups already selected in accordance with the player's previous selection operations is smaller than the total number of characters preset for the deck, the screen data generation process may be made to generate screen data used to display, in the group display area, other groups capable of supplementing the number of missing characters by using other characters that are not the common characters.

In accordance with such a game program, a deck can be assembled in a more efficient manner because the player can select other groups that take the number of missing characters into consideration.

In addition, the screen data generation process may be made to generate screen data which, along with displaying a plurality of characters constituting the other groups in the group display area side by side, changes the way the characters constituting the other groups are displayed depending on whether the characters are the common characters or not the common characters.

In accordance with such a game program, the player can readily ascertain whether or not there are characters in common with the characters of the previously selected groups.

In addition, when a list view of all or some of the extracted groups is shown in the group display area, the screen data generation process may be made to generate screen data for display according to the level configured for each group.

In accordance with such a game program, a deck can be assembled more readily because groups can be selected on a level-by-level basis.

In addition, this is an information processing device equipped with:

a group extraction processing unit in which, based on player information having configured therein a plurality of characters owned by a player and group information having configured therein a plurality of groups respectively composed of a plurality of pre-associated characters, all of the groups that can be constituted by combining the plurality of characters owned by the player are extracted from among the plurality of groups;

a deck assembly processing unit in which a deck constituted by combining consecutively selected groups is assembled by consecutively selecting groups from among all of the extracted groups each time a selection operation is performed by the player; and a game progression processing unit in which a battle game, wherein the deck is engaged in a battle, is conducted by causing the deck to generate special effects associated with each selected group.

Such an information processing device makes it possible to reduce the effort required for the operations performed by the player during deck assembly.

Embodiments

<<Constitution of Game System 1>>

FIG. 1 is a diagram illustrating an example overall constitution of the game system 1. The game system 1 provides various game-related services to players over a network 2 (for example, the Internet) and includes a server device 10 and a plurality of player terminals 20.

The game system 1 according to the present embodiment can provide the player with a battle game that is conducted using game media. Battle-type card games conducted using character cards (hereinafter referred to as "characters" for short), as an example of the game media, will be discussed below.

The battle-type card game of the present embodiment is a battle game, in which a deck composed of a plurality of characters owned by the player (hereinafter referred to as "player deck") is pitted against another deck serving as an opponent (hereinafter referred to as "enemy deck"). In this battle game, before a battle is initiated, the player assembles a player deck by combining characters selected from among the plurality of characters in his or her possession. During deck assembly, the player can assemble a player deck by selecting characters one by one from among the plurality of characters in his or her possession, and can also readily assemble a player deck by selecting groups composed of a plurality of mutually associated characters.

<<Configuration of Server Device 10>>

FIG. 2 is a block diagram illustrating a functional constitution of the server device 10. The server device 10 is an information processing device (for example, a workstation, a personal computer, etc.) used when a system administrator, etc., operates and manages various types of services. When various commands (requests) are received from the player terminals 20, the server device 10 transmits (responds with) game programs that are operational on the player terminals 20 and various types of data, as well as web pages (game screens, etc.) created using a markup language (HTML, etc.) compliant with the specifications of the player terminals 20. The server device 10 has a control unit 11, a storage unit 12, an input unit 13, a display unit 14, and a communication unit 15.

Along with forwarding data between the components, the control unit 11 exercises overall control over the server device 10 and is implemented using a CPU (Central Processing Unit) that runs a predetermined program stored in memory. The control unit 11 of the present embodiment is equipped with at least a group extraction processing unit 111, a deck assembly processing unit 112, a game progression processing unit 113, and a screen data generation processing unit 114.

The group extraction processing unit 111 has the functionality to carry out processing to extract groups composed of a plurality of pre-associated characters. The group extraction processing unit 111 of the present embodiment extracts all of the groups that can be constituted by combining the plurality of characters owned by the player from among a plurality of preset groups.

The deck assembly processing unit 112 has the functionality to carry out processing to assemble a deck composed of a plurality of characters. A deck is a group of characters in which a plurality of characters is combined into a single set. The deck assembly processing unit 112 of the present embodiment consecutively selects groups from all of the groups extracted by the group extraction processing unit 111 and assembles a player deck by combining these groups.

The game progress processing unit 113 possesses the functionality to carry out processing to progress through a battle game in accordance with the game program. When a deck is assembled by combining the groups, the game progression processing unit 113 of the present embodiment directs the progress of the battle game by causing the deck to generate special effects associated with the groups.

The screen data generation processing unit 114 possesses the functionality to carry out processing to generate screen data used for displaying a game screen on the player terminals 20. The screen data generation processing unit 114 of the present embodiment generates HTML data as screen data corresponding to the game screen.

The storage unit 12, which has a ROM (Read Only Memory), i.e. a read-only storage area where operating system software is stored, and a RAM (Random Access Memory), i.e. a rewritable storage area used as a work area for arithmetic processing by the control unit 11, is implemented using a flash memory, a hard disk, or another non-volatile storage device. The storage unit 12 of the present embodiment stores at least character information, i.e. character-related information, group information, i.e. group-related information, and player information, i.e. player-related information.

The input unit 13, which is used by a system administrator etc. to enter various types of data (e.g., character information, group information, etc.), is implemented, for example, using a keyboard, a mouse, or the like.

The display unit 14, which is used to display an operation screen for use by a system administrator in response to a command from the control unit 11, is implemented using, for example, a liquid crystal display (LCD: Liquid Crystal Display), or the like.

The communication unit 15, which operates as a transceiver unit used for transmitting and receiving various types of information to and from the player terminals 20 over a network 2, is implemented using, for example, an NIC (Network Interface Card) or the like.

FIG. 3 is a diagram illustrating an example of a data structure of character information. This character information has configured therein, in association with character IDs, at least a character name, a character image, an effect ID used to identify the clothes, etc. of a character, a motif ID used to identify the maturity status of a character (child, adult, etc.), as well as the initial and maximum values of various parameters, such as initial attack strength, maximum attack strength, initial defense strength, maximum defense strength, initial hit points, maximum hit points, and so forth.

FIG. 4 is a diagram illustrating an example of a data structure of group information. This group information has configured therein, in association with group IDs, at least a group title, a level (maximum level: 6), mutually associated constituent characters, and special effects. In other words, this group information has pre-configured therein a plurality of groups composed of a plurality of mutually associated characters. In addition, in accordance with the present embodiment, if such groups are included in a player deck, the total attack strength and total defense strength of this player deck is increased as a special effect.

FIG. 5 is a diagram illustrating an example of a data structure of player information. This player information has configured therein, in association with player IDs, at least a player name, proprietary character information, i.e. information relating to the characters owned by the player (also referred to as "proprietary characters" below), and deck information, i.e. information relating to a player deck assembled in accordance with the player's operations.

FIG. 6 is a diagram illustrating an example of a data structure of proprietary character information. This proprietary character information has configured therein, in association with the character IDs of the proprietary characters, the current value of various parameters, at least such as level, attack strength, defense strength, and hit points.

FIG. 7 is a diagram illustrating an example of a data structure of deck information. This deck information has configured therein, in association with the area IDs of unit areas into which the deck display area is divided, the character IDs of the proprietary characters constituting the player deck.

<<Constitution of Player Terminal 20>>

FIG. 8 is a block diagram illustrating a functional constitution of the player terminal 20.

The player terminal 20 is an information processing device (for example, a tablet terminal, a mobile phone terminal, a smartphone, etc.) that can be owned and used by a player. Due to its web browser functionality, the player terminal 20 is capable of on-screen display of web pages (game screens, etc.) transmitted from the server device 10. The player terminal 20 has a terminal control unit 21, which performs overall control of the player terminal 20, a terminal storage unit 22, which stores various types of data and software programs, a terminal control unit 23, which is used by the player for control input, a terminal display unit 24, which displays game screens and operation screens, and a terminal communication unit 25, which communicates information to and from the server device 10.

<<Operation of Game System 1>>

FIG. 9 is a flow chart used to illustrate an example of an operation of the game system 1. FIG. 10-FIG. 13 are diagrams illustrating screen transitions during deck assembly. The operation of the system during deck assembly by combining groups will be discussed below in specific detail.

First of all, when a command to initiate deck assembly (deck assembly initiation request) is received from a player terminal 20, the server device 10 extracts groups composed of a plurality of pre-associated characters (S101). Namely, based on the group information illustrated in FIG. 4 and the proprietary character information illustrated in FIG. 6, the group extraction processing unit 111 extracts all of the groups that can be constituted by combining the player's proprietary characters from the plurality of preset groups. In addition, after directing the screen data generation processing unit 114 to generate screen data (HTML data) used to display a game screen for deck assembly on the player terminal 20, the server device 10 transmits this screen data to the requesting player terminal 20.

Subsequently, upon receipt of the screen data transmitted from the server device 10, the player terminal 20 analyzes this screen data and, based on that, directs the terminal display unit 24 to display the game screen for deck assembly 50 illustrated in FIG. 10 (S102). A deck display area 51, a constituent group display area 52, a parameter display area 53, a pull-down menu 54, a group display area 55, a group 56, and a control button 56A are displayed on the game screen for deck assembly 50.

A player deck assembled in accordance with the player's operations is displayed in the deck display area 51. In the present embodiment, a player deck with a total of 9 characters is displayed in the deck display area 51, which is divided into a total of 3×3, i.e. 9 squares. At this point, no characters are displayed in the squares because this is a state prior to player deck assembly.

A list view of the groups extracted by the group extraction processing unit 111 is shown on a level-by-level basis in the group display area 55. Here, only the group 56 ("Clan A") of the highest Level 6 is displayed among all of the groups extracted by the group extraction processing unit 111, with the five proprietary characters constituting this group 56 (mutually associated characters) displayed side by side.

At this point, the pull-down menu 54 is selected if the player does not want to use the group 56 displayed in the group display area 55 for deck assembly. When the pull-down menu 54 is selected as a result of the player's operations, a list view of the groups below Level 6 among all of the groups extracted by the group extraction processing unit 111 is shown in the group display area 55. On the other hand, the control button 56A is selected if the player wants to use the group 56 displayed in the group display area 55 for deck assembly. When the control button 56A is selected as a result of the player's operation, the five proprietary characters constituting the group 56A are incorporated into the player deck. A case, in which the control button 56A is selected by the player, will be discussed below.

Going back to FIG. 9, next, upon receipt of a command requesting deck assembly (a deck assembly request) from the player terminal 20, the server device 10 assembles a player deck based on the fact that the control button 56A has been selected (S103). Namely, in accordance with the player's selection operations, the deck assembly processing unit 112 selects the group 56 from all of the groups extracted by the group extraction processing unit 111 and assembles a player deck comprising the selected group 56. At such time, the deck assembly processing unit 112 updates the player's deck information (see FIG. 7) such that the five proprietary characters constituting the group 56 are incorporated into the player deck.

Subsequently, the server device 10 determines whether or not the player deck used in a battle with an enemy deck is complete (S104). Namely, the deck assembly processing unit 112 determines whether or not the total number of characters (nine) preset for the player deck has been reached as a result of incorporating the five proprietary characters constituting the group 56 into the player deck. Because at this point the player deck is four characters short and still incomplete (S104: NO), execution goes back to Step 102. Accordingly, after directing the screen data generation processing unit 114 to generate screen data (HTML data) used to display a game screen for deck assembly on the player terminal 20 once again, the server device 10 transmits this screen data to the requesting player terminal 20.

Subsequently, upon receipt of the screen data transmitted from the server device 10, the player terminal 20 analyzes this screen data and, based on that, directs the terminal display unit 24 to display the game screen for deck assembly 50 illustrated in FIG. 11 as the next screen transition (S102).

As shown in FIG. 11, a player deck assembled using groups already selected in the group display area 55 in accordance with the player's previous selection operations is displayed in the deck display area 51. Here, the five proprietary characters constituting the group 56 are displayed on the game screen for deck assembly 50 illustrated in FIG. 10 because the group 56 has been previously selected in the group display area 55. At the same time, the group title of the group 56 is displayed in the constituent group display area 52, and the parameter values (total attack strength and total defense strength) of the player deck reflecting the special effects configured in the group 56 are displayed in the parameter display area 53.

In addition, as shown in FIG. 11, the groups of the highest level that are capable of supplementing the missing characters in the total number of characters preset for the player deck among the remaining groups extracted by the group extraction processing unit 111 are displayed in the group display area 55. Since at this point the deck is four characters short of the total number of characters (nine) of the player deck in the deck display area 51, two groups ("Three Generals" and "Parent-Child Relationship") that are composed of three proprietary characters among the remaining groups extracted by the group extraction processing unit 111 are displayed in the group display area 55. These two groups are the groups of the highest Level 5 among the groups capable of supplementing the missing characters. A case, in which the control button 57A is selected as a result of the player's operations and the three proprietary characters constituting the group 57 are incorporated into the player deck, will be discussed below.

Going back to FIG. 9, next, upon receipt of a command requesting deck assembly (a deck assembly request) from the player terminal 20, the server device 10 assembles a player deck based on the fact that the control button 57A has been selected (S103). Namely, in accordance with the player's selection operations, the deck assembly processing unit 112 selects the group 57 from the remaining groups extracted by the group extraction processing unit 111 and assembles a player deck comprising the selected group 57 and the previously selected group 56. At such time, the deck assembly processing unit 112 updates the player's deck information (see FIG. 7) such that the three proprietary characters constituting the group 57 are also incorporated into the player deck.

Subsequently, the server device 10 determines whether or not the player deck is complete (S104). Namely, the deck assembly processing unit 112 determines whether or not the total number of characters (nine) preset for the player deck has been reached as a result of incorporating the eight proprietary characters constituting the groups 56, 57 into the player deck. Because at this point the player deck is one character short and still incomplete (S104: NO), execution goes back to Step 102. Accordingly, after directing the screen data generation processing unit 114 to generate screen data (HTML data) used to display a game screen for deck assembly on the player terminal 20 once again, the server device 10 transmits this screen data to the requesting player terminal 20.

Subsequently, upon receiving the screen data transmitted from the server device 10, the player terminal 20 analyzes this screen data and, based on that, directs the terminal display unit 24 to display the game screen for deck assembly 50 illustrated in FIG. 12 as the next screen transition (S102).

As shown in FIG. 12, the eight proprietary characters constituting the groups 56, 57 previously selected in the group display area 55 are displayed in the deck display area 51 on the game screen for deck assembly 50 illustrated in FIG. 10 and FIG. 11. At the same time, the group titles of the groups 56, 57 are respectively displayed in the constituent group display area 52 and the parameter values of the player deck that respectively reflect the special effects configured in the groups 56, 57 are displayed in the parameter display area 53.

In addition, as shown in FIG. 12, the groups of the highest level that are capable of supplementing the missing characters in the total number of characters preset for the player deck among the remaining groups extracted by the group extraction processing unit 111 are displayed in the group display area 55. At this point, the deck is one character short of the total number of characters (nine) of the player deck in the deck display area 51. For this reason, the group display area 55 shows a list view of other groups that include characters in common with the previously selected groups 56, 57 (in other words, the groups in the deck display area 51), i.e. other groups ("Clan B", "Teacher-Student Relationship") capable of supplementing the number of missing characters (one) by using other characters that are not the common characters. The other groups are the groups of the highest Level 4 among the groups capable of supplementing the missing characters. In addition, the way the characters that constitute the other groups are displayed differs depending on whether they are common characters or not common characters. Here, "Assembly in progress" is displayed next to the common characters. A case, in which the control button 58A is selected as a result of the player's operations and one other character that is not a common character among the five proprietary characters constituting the group 58 is incorporated into the player deck, will be discussed below.

Going back to FIG. 9, next, upon receipt of a command requesting deck assembly (a deck assembly request) from the player terminal 20, the server device 10 assembles a player deck based on the fact that the control button 58A has been selected (S103). Namely, in accordance with the player's selection operations, the deck assembly processing unit 112 selects the group 58 from the remaining groups extracted by the group extraction processing unit 111 and assembles a player deck composed of the selected group 58 and the previously selected groups 56, 57. At such time, the deck assembly processing unit 112 updates the player's deck information (see FIG. 7) such that the three proprietary characters constituting the group 58 are also incorporated into the player deck.

Next, the server device 10 determines whether or not the player deck is complete (S104). Namely, the deck assembly processing unit 112 determines whether or not the total number of characters (nine) preset for the player deck has been reached as a result of incorporating, into the player deck, one other character that is not a common character among the five proprietary characters constituting the group 58. Because at this point the player deck is composed of all nine proprietary characters, thereby making the player deck complete (S104: YES), execution advances to Step 105.

Next, when the player deck is complete, the player terminal 20 receives screen data transmitted from the server device 10 and directs the terminal display unit 24 to display the game screen for deck assembly 50 illustrated in FIG. 13 as the next screen transition. As shown in FIG. 13, the nine proprietary characters constituting the groups 56, 57, and 58, which have been consecutively selected in the group display area 55, are displayed as a complete player deck in the deck display area 51. At the same time, the group titles of the groups 56, 57, and 58 are respectively displayed in the constituent group display area 52 and the parameter values of the player deck that respectively reflect the special effects configured in the groups 56, 57, and 58 are displayed in the parameter display area 53. In addition, a control button 59 used to decide whether to use this player deck and a control button 60 used to undo changes are displayed on this game screen 50.

Next, when the player selects either the control button 59 or the control button 60 on the game screen for deck assembly 50 illustrated in FIG. 13, the player terminal 20 transmits this operation information to the server device 10. Then, the server device 10 uses the operation information received from the player terminal 20 to determine whether or not a decision to use the player deck has been made (S105). Namely, if the control unit 11 determines that the control button 59 has been selected by the player (S105: YES), this process is terminated. On the other hand, if the control unit 11 determines that the control button 60 has been selected by the player (S105: NO), then, after resetting the player deck (resetting the player's deck information) (S106), execution goes back to Step S102 and the subsequent processing is repeated.

As mentioned above, in accordance with the game system 1 described in the present embodiment, when a player deck is assembled, all of the groups that can be constituted by combining the player's proprietary characters are extracted from a plurality of groups respectively composed of a plurality of mutually associated characters (groups capable of generating special effects). In addition, groups are consecutively selected from all of the extracted groups each time a selection operation is performed by the player and a player deck is assembled by combining the consecutively selected groups. Because the special effects associated with the groups constituting the deck are respectively generated when the player deck is assembled in this manner, the battle game can be conducted in an advantageous manner. In addition, as a result, the player can readily assemble a player deck capable of producing special effects simply by consecutively selecting automatically extracted groups even when it is unknown which characters are mutually related (which group can generation special effects), thereby making it possible to reduce the effort required for the operations performed by the player during deck assembly.

Other Embodiments

The foregoing embodiment was intended to facilitate the understanding of the present invention and is not to be construed as limiting the present invention. The present invention can be modified and improved without departing from its essential meaning and the present invention includes equivalents thereto. In particular, the embodiments described below are also included in the present invention.

<Special Effects>

Although the present embodiment as described above has been discussed with respect to a case in which, as an example of a special effect, the parameters (total attack strength and total defense strength) configured in the player deck are increased, the present invention is not limited thereto. For example, the player deck (or each character) may be allowed to use lethal techniques and other special attacks.

In addition, although the present embodiment as described above has been discussed with respect to a case in which groups configured in the group information illustrated in FIG. 4 are included in the player deck and a case in which special effects are generated in any event, the present invention is not limited thereto. For example, the special effects may be generated randomly based on a predetermined generation probability.

<Game Screen Used for Assembly>

Although the present embodiment, as described above, has been discussed with respect to the game screen 50 (FIG. 11-FIG. 13), which shows a list view of some of the groups extracted by the group extraction processing unit 111 and which is used as a game screen for deck assembly generated by the screen data generation processing unit 114, the present invention is not limited thereto. For example, a list view of all of the groups extracted by the group extraction processing unit 111 may be provided.

In addition, in the present embodiment as described above, there may be displayed detailed information (attack strength, defense strength, levels, etc.) relating to the constituent characters of each group displayed in the group display area 55. This allows the player to assemble a deck while referring to detailed information on the characters.

<Deck Assembly>

Although the present embodiment as described above has been discussed with respect to a case involving assembling a player deck by combining consecutively selected groups, the present invention is not limited thereto. For example, it may be possible to both select characters one by one from among a plurality of characters in one's possession and, at the same time, select groups composed of a plurality of mutually associated characters. Specifically, as shown in FIG. 10-FIG. 12, after assembling a player deck by consecutively selecting the groups 56, 57 in accordance with the player's selection operations, the deck assembly processing unit 112 may complete the player deck by selecting one remaining character from among the proprietary characters.

<Game Media>

Although the present embodiment as described above has been discussed with respect to a battle game conducted using character cards (virtual cards) as an example of game media, the present invention is not limited thereto. For example, figures (characters) imitating the shapes of people, animals, other characters, and so forth may be used as an example of game media.

<Server Device>

Although the present embodiment as described above has been discussed with respect to a game system 1 equipped with a single server device 10 as an example of a server device, the invention is not limited thereto and a game system 1 equipped with a plurality of server devices 10 as an example of server devices may also be used. In other words, a plurality of server devices 10 may be connected over a network 2 and these server devices 10 may perform various types of processing in a distributed manner.

<Information Processing Device>

Although the game system 1 used in the present embodiment as described above has been described with respect to a case, in which various types of information processing are carried out by directing the server device 10 and the player terminals 20 to cooperate in performing various types of information processing in accordance with a game program, the invention is not limited thereto; the above-mentioned various types of information processing may be carried out in the game program using only the server device 10 or only the player terminals 20 as an information processing device.

In addition, a constitution may be used in which the player terminals 20 support some of the information processing device functionality. In such a case, the server device 10 and player terminals 20 form an information processing device.

It should be noted that the information processing device is an example of a computer equipped with a processor and a memory.

DESCRIPTION OF REFERENCE NUMERALS

1 Game system
2 Network
10 Server device
11 Control unit
12 Storage unit
13 Input unit
14 Display unit
15 Communication unit
20 Player terminal
21 Terminal control unit
22 Terminal storage unit
23 Terminal input unit
24 Terminal display unit
25 Terminal communication unit
50 Game screen
51 Deck display area
52 Constituent group display area
53 Parameter display area
54 Pull-down menu
55 Group display area
56 Group
56A Control button
57 Group
57A Control button
58 Group
58A Control button
59 Control button
60 Control button
111 Group extraction processing unit
112 Deck assembly processing unit
113 Game progress processing unit
114 Screen data generation unit

The invention claimed is:

1. A non-transitory computer readable medium having machine-executable instructions for in-game graphic recognition, the machine-executable instructions directing a computer to perform:

group extraction during which, based on player information having configured therein a plurality of characters owned by a player and group information having configured therein a plurality of groups, wherein each group of the plurality of groups comprises a plurality of pre-associated characters, wherein the each group of the plurality of pre-associated characters is associated with special effects to be provided to parameters of a deck, wherein all of the groups that can be constituted by combining a plurality of characters owned by the player are extracted from among a plurality of groups;

deck assembly during which a deck constituted by combining consecutively selected groups is assembled by consecutively selecting groups from among all of the extracted groups in accordance with the player's selection operations each time a selection operation is performed by the player until the number of characters preset for the deck is reached, wherein the plurality of pre-associated characters of each group of the consecutively selected groups is included in the deck;

game progression during which a battle game, wherein the deck is engaged in a battle, is conducted by causing the deck to generate respectively the special effects associated with each selected group; and screen data generation which generates screen data used to display, on a game screen, a group display area that shows a list view of all or some of the extracted groups, and a deck display area that displays the deck assembled using groups selected in the group display area in accordance with the player's selection operations, and, when the player's selection operations are performed in a continuous manner, generates screen data used to display a deck assembled using groups already selected in accordance with the player's previous selection operations in the deck display area, as well as to display, in the group display area, other groups that include characters in common with the groups already selected in accordance with the player's previous selection operations, and which is the screen data generation that generates screen data used to display the other groups capable of supplementing an insufficient character number in the group display area using other characters that are not common characters if the number of characters in the deck assembled using the groups already selected in accordance with the player's previous selection operations is smaller than the total number of characters preset for the deck.

2. The game program according to claim 1, wherein the screen data generation generates screen data which, along with displaying a plurality of characters constituting the other groups in the group display area side by side, changes the way the characters constituting the other groups are displayed depending on whether the characters are the common characters or not the common characters.

3. The game program according to claim 1, wherein the screen data generation generates screen data for display according to a level configured for each group when a list view of all or some of the extracted groups is shown in the group display area.

4. An information processing device equipped with:
   a group extraction processing unit in which, based on player information having configured therein a plurality of characters owned by a player and group information having configured therein a plurality of groups, wherein each group of the plurality of groups comprises a plurality of pre-associated characters, wherein the each group of the plurality of pre-associated characters is associated with special effects to be provided to parameters of a deck, wherein all of the groups that can be constituted by combining a plurality of characters owned by the player are extracted from among a plurality of groups;
   a deck assembly processing unit in which a deck constituted by combining consecutively selected groups is assembled by consecutively selecting groups from among all of the extracted groups in accordance with the player's selection operations each time a selection operation is performed by the player, until the number of characters preset for the deck is reached, wherein the plurality of pre-associated characters of each group of the consecutively selected groups is included in the deck;
   a game progression processing unit in which a battle game, wherein the deck is engaged in a battle, is conducted by respectively causing the deck to generate the special effects associated with each selected group; and
   a screen data generation processing unit which
   generates screen data used to display, on a game screen, a group display area that shows a list view of all or some of the extracted groups, and a deck display area that displays the deck assembled using groups selected in the group display area in accordance with the player's selection operations, and,
   when the player's selection operations are performed in a continuous manner,
   generates screen data used to display a deck assembled using groups already selected in accordance with the player's previous selection operations in the deck display area, as well as to display, in the group display area, other groups that include characters in common with the groups already selected in accordance with the player's previous selection operations,
   and which is a screen data generation processing unit that generates screen data used to display the other groups capable of supplementing an insufficient character number in the group display area using other characters that are not common characters if the number of characters in the deck assembled using the groups already selected in accordance with the player's previous selection operations is smaller than the total number of characters preset for the deck.

* * * * *